(12) United States Patent
Woo et al.

(10) Patent No.: US 8,642,437 B2
(45) Date of Patent: Feb. 4, 2014

(54) GAP-FILLING COMPOSITION WITH EXCELLENT SHELF LIFE BY END-CAPPING

(75) Inventors: Chang Soo Woo, Suwon-si (KR); Hee Jae Kim, Seoul (KR); Sung Jae Lee, Incheon-si (KR); Sang Geun Yun, Gunpo-si (KR); Tae Ho Kim, Seoul (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 883 days.

(21) Appl. No.: 12/659,908

(22) Filed: Mar. 25, 2010

(65) Prior Publication Data

US 2010/0190310 A1 Jul. 29, 2010

Related U.S. Application Data

(63) Continuation of application No. PCT/KR2007/007063, filed on Dec. 31, 2007.

(30) Foreign Application Priority Data

Oct. 2, 2007 (KR) .......................... 10-2007-0099529

(51) Int. Cl.
*H01L 21/12* (2006.01)
*C08L 83/06* (2006.01)

(52) U.S. Cl.
USPC .................... 438/381; 524/588; 257/E21.008

(58) Field of Classification Search
None
See application file for complete search history.

(56) References Cited

U.S. PATENT DOCUMENTS

| 3,337,351 | A | * | 8/1967 | Morehouse ..................... 106/13 |
| 5,691,396 | A | | 11/1997 | Takemura et al. |
| 6,001,918 | A | | 12/1999 | Enami et al. |
| 6,008,540 | A | * | 12/1999 | Lu et al. ......................... 257/758 |
| 6,262,170 | B1 | * | 7/2001 | Kilgour et al. ................. 524/731 |
| 6,787,191 | B2 | * | 9/2004 | Hanahata et al. ............. 427/387 |
| 6,852,367 | B2 | | 2/2005 | You et al. |
| 7,517,815 | B2 | | 4/2009 | Cho et al. |
| 7,947,795 | B2 | * | 5/2011 | Sung et al. ................. 526/318.4 |
| 8,329,376 | B2 | * | 12/2012 | Ogihara et al. ............. 430/270.1 |
| 2002/0042020 | A1 | | 4/2002 | Gallagher et al. |
| 2006/0024980 | A1 | * | 2/2006 | Tsuchiya et al. ............. 438/789 |
| 2006/0134234 | A1 | * | 6/2006 | Fonolla Moreno et al. .. 424/729 |
| 2007/0042604 | A1 | | 2/2007 | Ahn et al. |
| 2007/0298349 | A1 | * | 12/2007 | Zhang et al. ................ 430/270.1 |
| 2008/0076059 | A1 | * | 3/2008 | Abdallah et al. ........... 430/270.1 |
| 2009/0159417 | A1 | * | 6/2009 | Lin et al. ....................... 200/600 |

FOREIGN PATENT DOCUMENTS

| JP | 2007-019486 | 1/2007 |
| JP | 2007-056262 | 3/2007 |
| KR | 10 2002-0028820 A | 4/2002 |
| KR | 10-2003-0041838 | 5/2003 |

* cited by examiner

*Primary Examiner* — Robert S Loewe
(74) *Attorney, Agent, or Firm* — Lee & Morse, P.C.

(57) ABSTRACT

A composition with improved shelf life for filling small gaps in a semiconductor device is provided. The composition comprises an end-capped silicone polymer. The molecular weight of the end-capped silicone polymer is not varied during storage. In addition, the dissolution rate (DR) of the composition in an alkaline developing solution is maintained at a desired level during storage. That is, the composition is highly stable during storage. Therefore, the composition is suitable for use in a node separation process for the fabrication of a semiconductor capacitor.

13 Claims, 2 Drawing Sheets

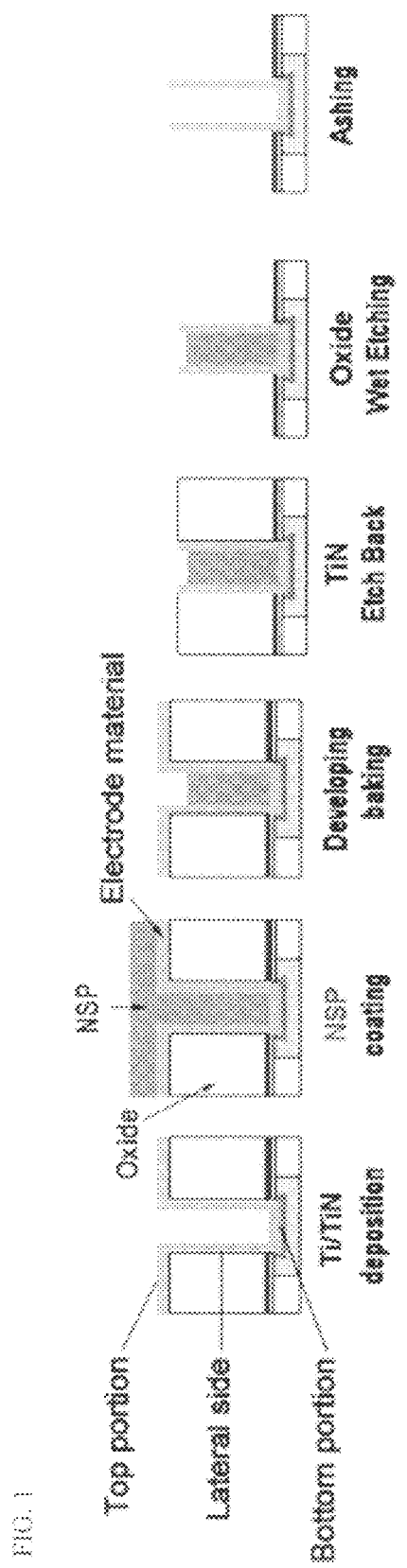

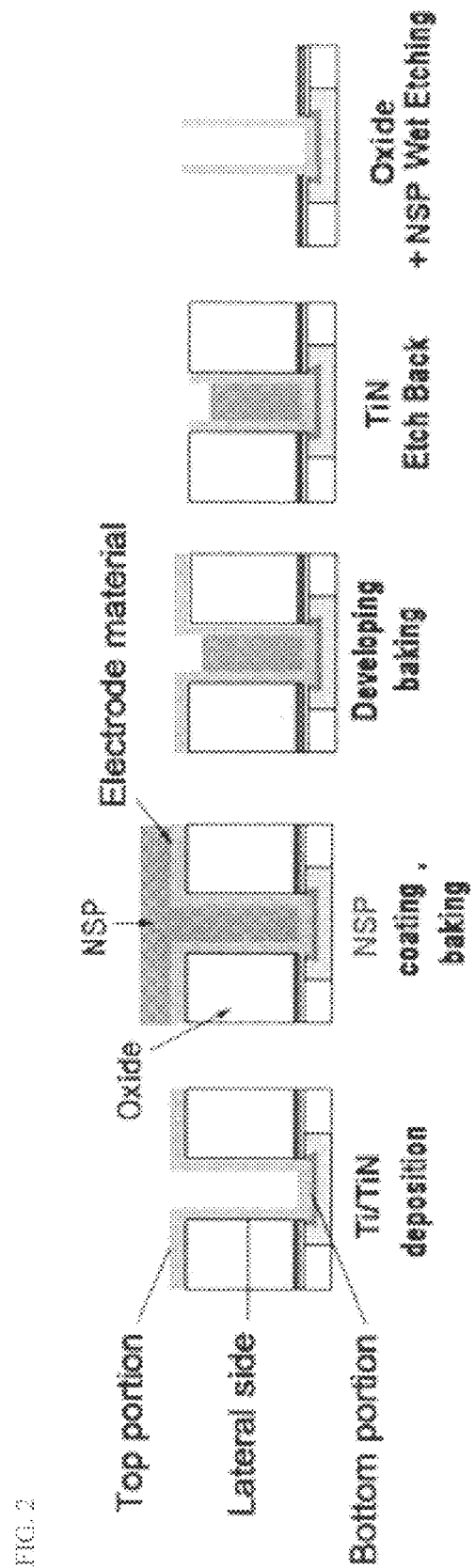

GAP-FILLING COMPOSITION WITH EXCELLENT SHELF LIFE BY END-CAPPING

CROSS-REFERENCE TO RELATED APPLICATION

This application is a continuation of pending International Application No. PCT/KR2007/007063, entitled "Gap-Filling Composition with Excellent Shelf Life by End-Capping," which was filed on Dec. 31, 2007, the entire contents of which are hereby incorporated by reference.

BACKGROUND

1. Technical Field

Embodiments of the present invention relate to a composition for filling small gaps in a semiconductor device (also referred to simply as a 'gap-filling composition'), and more particularly to a node separation polymer (NSP) composition with excellent shelf life that is suitable for use in the fabrication of a semiconductor capacitor.

2. Background Art

Schematic diagrams illustrating a node separation process for the fabrication of a conventional semiconductor capacitor are shown in FIG. 1. First, Ti/TiN as an electrode material is applied to an oxide mold (i.e., an oxide for patterning), and then patterned holes are filled with a node separation polymer (NSP) composition (i.e., a gap-filling composition). Thereafter, the resulting structure is developed with a developing solution to remove the NSP material coated on the top portions of the electrode material layer, followed by baking. Etch back is performed to remove the top portions of the electrode material layer. Next, wet etching and ashing are sequentially performed to remove the oxide and the NSP material, respectively. If the said NSP materials are applied to patterned holes having smaller hole size, the surface of TiN is toughened during ashing, which causes difficulty in applying dielectric materials in the subsequent step. As semiconductor devices become smaller in size and thickness, there is a strong need for novel node separation polymer (NSP) materials that can eliminate the need for ashing. The use of such NSP materials can be expected to contribute to the simplification of processing equipment and the reduction of fabrication costs. FIG. 2 illustrates a node separation process for the fabrication of a semiconductor capacitor without the need for ashing.

A novel NSP material capable of eliminating the need for ashing is filled in patterned holes and is then removed by wet etching using a hydrofluoric acid solution for the removal of an oxide for patterning. It is anticipated that a silicone polymer having a basic structure similar to that of the oxide or a composition comprising the silicone polymer would be effective as the NSP material.

However, a general silicone polymer undergoes slow self-condensation between terminal hydroxyl (—OH) groups. This self-condensation deteriorates the shelf life of a composition comprising the polymer. Particularly, the dissolution rate (DR) of the NSP material must be maintained constant during development, which is the most important step in NSP processing, in every process. Therefore, self-condensation results in a gradual increase in the molecular weight of the polymer to retard the dissolution rate of the NSP material.

SUMMARY

Embodiments of the present invention provide a node separation polymer (NSP) composition (i.e. a composition for filling small gaps in a semiconductor device) comprising an end-capped silicone polymer that can be developed at a constant dissolution rate with a developing solution and is highly stable in terms of dissolution rate (DR) during storage, thus being suitable for use in the fabrication of a semiconductor capacitor.

According to an embodiment of the present invention, there is provided a composition for filling small gaps in a semiconductor device comprising a silicone polymer, an end-capping agent and a solvent wherein the end-capping agent is represented by Formula 1:

$$[HO]_x\text{—R—}[CO_2H]_y \quad (1)$$

wherein R is an allyl group or a $C_1$-$C_{12}$ straight, branched or cyclic alkyl group which is unsubstituted or substituted with at least one hydroxyl or carboxyl group, x is an integer from 1 to 4, and y is an integer from 0 to 3.

The molecular weight of the end-capped silicone polymer of the composition according to an embodiment of the present invention is not varied during storage. In addition, the dissolution rate (DR) of the composition, which is defined as a rate at which the composition is dissolved in an alkaline developing solution, according to an embodiment of the present invention is maintained constant. That is, the composition according to an embodiment of the present invention is highly stable during storage. Therefore, the composition according to an embodiment of the present invention is suitable for use in a node separation process for the fabrication of a semiconductor capacitor.

BRIEF DESCRIPTION OF THE DRAWINGS

FIG. 1 illustrates a node separation process for the fabrication of a conventional semiconductor capacitor; and FIG. 2 illustrates a node separation process for the fabrication of a semiconductor capacitor according to an embodiment of the present invention.

DETAILED DESCRIPTION

Korean Patent Application No. 10-2007-0099529, filed on Oct. 2, 2007, in the Korean Intellectual Property Office, and entitled: "Gap-Filling Composition with Excellent Shelf Life by End-Capping," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. Like reference numerals refer to like elements throughout.

An embodiment of the present invention provides a composition prepared by mixing 0.001 to 10 parts by weight of an end-capping agent with 1 to 50 parts by weight of a silicone polymer in 40 to 98 parts by weight of a solvent, based on 100 parts by weight of the composition, wherein the end-capping agent is represented by Formula 1:

$$[HO]_x\text{—R—}[CO_2H]_y \quad (1)$$

wherein R is an allyl group or a $C_1$-$C_{12}$ straight, branched or cyclic alkyl group which is unsubstituted or substituted with at least one hydroxyl or carboxyl group, x is an integer from 1 to 4, and y is an integer from 0 to 3.

The end-capping agent of Formula 1 is characterized by the presence of hydroxyl and/or carboxyl functional groups. Particularly, one or more hydroxyl groups are included in the end-capping agent. As the number of hydroxyl groups in the end-capping agent increases, the shelf life of the composition may be advantageous in terms of dissolution rate (DR). The hydroxyl groups of the end-capping agent serve to protect the terminal hydroxyl groups of the silicone polymer to prevent unwanted polymerization of the silicone polymer and deterioration in the developability of the composition. At least one carboxyl group adjacent to the hydroxyl groups functions to enhance the protective effect of the hydroxyl groups on the terminal groups of the silicone polymer.

Another important function of the end-capping agent is to maintain the developability of the composition with an alkaline developing solution, which is essential for a node separation process. The developability of the composition can be maintained due to the presence of the hydroxyl and/or carboxyl groups remaining unreacted with the terminal hydroxyl groups of the silicone polymer.

There is no particular limitation on the type of the silicone polymer. The silicone polymer is preferably a siloxane polymer. A polysilsesquioxane is particularly preferred.

One example of suitable polysilsesquioxanes may be a compound represented by Formula 2:

$$\{(R'SiO_{1.5})_x(HSiO_{1.5})_y(X(CH_2)_nSiO_{1.5})_z\}_m \quad (2)$$

wherein x, y and z satisfy the relations x+y+z=1, $0.05 \leq x \leq 0.9$, $0 \leq y \leq 0.9$ and $0.05 \leq z \leq 0.9$, X is a $C_6$-$C_{12}$ aryl group, R' is a $C_1$-$C_6$ alkyl group, n is from 0 to 2, and m is from 12 to 2,000.

The compound of Formula 2 may be a polycondensate of hydrolysates prepared by the reaction of 5 to 90 parts by weight of a compound of Formula 4:

$$[RO]_3Si\text{---}[CH_2]_nX \quad (4)$$

wherein X is a $C_6$-$C_{12}$ aryl group, n is from 0 to 2 and R is a $C_1$-$C_6$ alkyl group, 0 to 90 parts by weight of a compound of Formula 5:

$$[RO]_3Si\text{---}H \quad (5)$$

wherein R is a $C_1$-$C_6$ alkyl group, and 5 to 90 parts by weight of a compound of Formula 6:

$$[RO]_3Si\text{---}R' \quad (6)$$

wherein R and R' are independently a $C_1$-$C_6$ alkyl group, in the presence of 0.001 to 5 parts by weight of an acid catalyst in 5 to 900 parts by weight of a solvent.

Another example of suitable polysilsesquioxanes may be a compound represented by Formula 3:

$$\{(R'SiO_{1.5})_s(HSiO_{1.5})_t(X(CH_2)_lSiO_{1.5})_u \\ (SiO_{1.5}(CH_2)_mSiO_{1.5})_v\}_n \quad (3)$$

wherein s, t, u and v satisfy the relations s+t+u+v=1, $0.05 \leq s \leq 0.9$, $0 \leq t \leq 0.9$, $0.05 \leq u \leq 0.9$ and $0.05 \leq v \leq 0.9$, X is a $C_6$-$C_{12}$ aryl group, R' is a $C_1$-$C_6$ alkyl group, l and m are independently from 0 to 2, and n is from 12 to 2,000.

In an embodiment, the compound of Formula 3 may be a condensation product of hydrolysates prepared by the reaction of 5 to 90 parts by weight of a compound of Formula 7:

$$[RO]_3Si\text{---}[CH_2]_n\text{---}Si[OR]_3 \quad (7)$$

wherein n is from 0 to 2 and R is a $C_1$-$C_6$ alkyl group, 5 to 90 parts by weight of a compound of Formula 8:

$$[RO]_3Si\text{---}[CH_2]_nX \quad (8)$$

wherein X is a $C_6$-$C_{12}$ aryl group, n is from 0 to 2 and R is a $C_1$-$C_6$ alkyl group, and 5 to 90 parts by weight of a compound of Formula 9:

$$[RO]_3Si\text{---}R' \quad (9)$$

wherein R and R' are independently a $C_1$-$C_6$ alkyl group, in 5 to 900 parts by weight of a solvent, based on 100 parts by weight of the sum of the compounds.

In an alternative embodiment, the compound of Formula 3 may be a condensation product of hydrolysates prepared by the reaction of 5 to 85 parts by weight of a compound of Formula 7:

$$[RO]_3Si\text{---}[CH_2]_n\text{---}Si[OR]_3 \quad (7)$$

wherein n is from 0 to 2 and R is a $C_1$-$C_6$ alkyl group, 5 to 85 parts by weight of a compound of Formula 8:

$$[RO]3Si\text{---}[CH2]nX \quad (8)$$

wherein X is a $C_6$-$C_{12}$ aryl group, n is from 0 to 2 and R is a $C_1$-$C_6$ alkyl group, 5 to 85 parts by weight of a compound of Formula 9:

$$[RO]_3Si\text{---}R' \quad (9)$$

wherein R and R' are independently a $C_1$-$C_6$ alkyl group, and 5 to 85 parts by weight of a compound of Formula 10:

$$[RO]_3Si\text{---}H \quad (10)$$

wherein R is a $C_1$-$C_6$ alkyl group, in 5 to 900 parts by weight of a solvent, based on 100 parts by weight of the sum of the compounds.

The silicone polymer preferably has a weight average molecular weight of 1,000 to 30,000. In view of gap-filling properties, it is more preferable that the silicone polymer have a weight average molecular weight of 1,000 to 10,000.

The solvent used in the composition according to an embodiment of the present invention may be a single solvent or a mixture of different solvents. When a mixture of different solvents is used, at least one solvent of the mixture is a high-boiling point solvent. The high-boiling point solvent acts to prevent the formation of voids within holes and dry a film to be formed using the composition at a low rate.

The solvent may be selected from the group consisting of alcohols, esters, glymes, ethers and cyclic ketones. Specifically, the solvent is selected from the group consisting of diethylene glycol monomethyl ether, diethylene glycol diethyl ether, ethyl-3-ethoxy propionate, methyl-3-methoxy propionate, cyclopentanone, cyclohexanone, propylene glycol monomethyl ether acetate, propylene glycol dimethyl ether acetate, 1-methoxy-2-propanol, ethyl lactate, hydroxyethyl acetate, and the like. These solvents may be used alone or in combination of two or more thereof. To obtain a desired coating thickness, the solvent is preferably used in an amount of 40 to 98 parts by weight, based on 100 parts by weight of the composition.

For better dispersibility, coating thickness uniformity and gap-filling properties, the gap-filling composition according to an embodiment of the present invention may further comprise a surfactant. It is preferable to add the surfactant in an amount of 0.001 to 10 parts by weight, based on 100 parts by weight of the composition. Surfactants suitable for use in embodiments of the present invention include: i) non-ionic surfactants, for example, polyoxyethylene alkyl ethers, such as polyoxyethylene lauryl ether, polyoxyethylene stearyl ether, polyoxyethylene cetyl ether and polyoxyethylene oleyl ether, polyoxyethylene alkylallyl ethers, such as polyoxyethylene nonylphenol ether, polyoxyethylene.polyoxypropylene block copolymers, and polyoxyethylene sorbitan fatty acid esters, such as sorbitan monolaurate, sorbitan monopalmitate, sorbitan monostearate, sorbitan monooleate, polyoxyethylene sorbitan monostearate, polyoxyethylene sorbitan trioleate and polyoxyethylene sorbitan tristearate; ii) fluorinated surfactants, such as EFTOP EF301, EF303, EF352

(Tochem Products Co., Ltd.), MEGAFAC F171, F173 (Dainippon Ink and Chemicals Inc.), FLUORAD FC430, FC431 (Sumitomo 3M Ltd.), and ASAHI GUARD AG710, SURFLON S-382, SC101, SC102, SC103, SC104, SC105, SC106 (Asahi Glass Co., Ltd.); and iii) silicon-based surfactants, such as organosiloxane polymer KP341 (Shinetsu Chemical Co., Ltd.). These surfactants may be used alone or in combination with of two or more thereof.

An embodiment of the present invention also provides a method for fabricating a semiconductor capacitor, the method comprising the steps of: forming an oxide mold (i.e., an oxide for patterning) on a semiconductor substrate to form patterned holes; depositing an electrode material on the oxide mold (i.e., the oxide for patterning); filling the gap-filling composition in the patterned holes deposited with the electrode material; developing the resulting structure with a developing solution to remove the composition coated on the top portions of the electrode material layer, followed by baking; removing the top portions of the electrode material layer by etch back; and simultaneously removing the oxide mold (i.e., the oxide for patterning) and the remaining composition filled in the patterned holes by wet etching to form lower electrodes.

Any wet etchant may be used in the method according to an embodiment of the present invention so long as it simultaneously dissolves the oxide and the composition. A hydrofluoric acid solution is preferably used as the wet etchant, and Ti/TiN may be used as the electrode material.

A dielectric layer is formed on each of the lower electrodes, and an upper electrode is formed thereon to complete the fabrication of a semiconductor capacitor.

Hereinafter, embodiments of the present invention will be explained in more detail with reference to the following examples. However, these examples are given for the purpose of illustration only and are not to be construed as limiting the scope of the invention.

EXAMPLES

Example 1

661 g of methyltrimethoxysilane and 119 g of phenyltrimethoxysilane were dissolved in 1,820 g of propylene glycol monomethyl ether acetate in a 3-liter four-neck flask equipped with a mechanical agitator, a condenser, a dropping funnel and a nitrogen inlet tube, and then 206 g of an aqueous nitric acid solution (1,000 ppm) was added thereto. Thereafter, the mixture was allowed to react at 50° C. for one hour. Methanol was removed from the reaction mixture under reduced pressure. The reaction was continued for one week while maintaining the reaction temperature at 60° C., yielding a polymer ('Polymer A') having a polydispersity (PD) of 2 and a weight average molecular weight ($M_w$) of 3,300. 10 g of Polymer A was diluted with 100 g of propylene glycol monomethyl ether acetate with sufficient stirring, and 1 g of glycolic acid (Sigma-Aldrich) as an end-capping agent and 0.1 g of a surfactant (Zonyl FSO-100, DuPont) were added thereto to prepare a gap-filling composition as a solution. A portion of the solution was spin-coated on a silicon wafer and baked at 90° C. for 50 seconds to form a 2,000 Å thick film. After the coated wafer was dipped in an aqueous solution of TMAH (2.38 wt %) at 23° C., the time required for the complete dissolution of the film (i.e., break through time (BTT) was measured using a DR tester (RDA-760, LTJ, Japan). The remaining portion of the solution was stored in a sealed bottle at room temperature.

Example 2

The procedure of Example 1 was repeated except that 1 g of ethylene glycol was used instead of glycolic acid.

Example 3

The procedure of Example 1 was repeated except that 1 g of 2,2-bis(hydroxymethyl)propionic acid was used instead of glycolic acid.

Example 4

488 g of bis(triethoxysilyl)ethane, 150 g of methyltrimethoxysilane and 55 g of phenyltrimethoxysilane were dissolved in 1,617 g of propylene glycol monomethyl ether acetate and 234 g of ethanol in a 3-liter four-neck flask equipped with a mechanical agitator, a condenser, a dropping funnel and a nitrogen inlet tube, and then 156 g of an aqueous nitric acid solution (1,000 ppm) was added thereto. Thereafter, the mixture was allowed to react at 50° C. for one hour. Methanol was removed from the reaction mixture under reduced pressure. The reaction was continued for 15 days while maintaining the reaction temperature at 50° C., yielding a polymer ('Polymer B') having a weight average molecular weight of about 3,500.

The subsequent procedure was the same as Example 1 except that 10 g of Polymer B was used instead of Polymer A.

Comparative Example 1

10 g of Polymer A was diluted with 100 g of propylene glycol monomethyl ether acetate with sufficient stirring to prepare a dilute solution. A portion of the solution was spin-coated on a silicon wafer and baked at 90° C. for 50 seconds to form a 2,000 Å thick film. The coated wafer was measured for BTT in accordance with the procedure described in Example 1. The remaining portion of the solution was filled in a sealed bottle and stored in the same place at room temperature.

The gap-filling compositions prepared in Examples 1 to 4 and Comparative Example 1 were tested for shelf life (variations in BTT and molecular weight) in accordance with the following method.

(1) Shelf Life (Variations in BTT and Molecular Weight)

Each of the compositions was stored at room temperature for 15 days, spin-coated in a 6" silicon wafer under the same conditions, and baked at 90° C. for 50 seconds. The film measured tested for BTT and molecular weight. The difference in BTT before and after the storage was calculated. The difference in the molecular weight of the polymer before and after the storage was calculated. The results are shown in Table 1.

TABLE 1

|  | BTT | | Molecular weight ($M_w$) | |
| --- | --- | --- | --- | --- |
|  | Before storage | After storage (room temperature, 15 days) | Before storage | After storage (room temperature, 15 days) |
| Example 1 | 7.0 | 7.1 | 3,300 | 3,300 |
| Example 2 | 7.0 | 7.2 | 3,300 | 3,300 |
| Example 3 | 7.0 | 7.4 | 3,300 | 3,300 |
| Example 4 | 6.2 | 6.3 | 3,500 | 3,500 |
| Comparative Example 1 | 7.0 | 18.8 | 3,300 | 4,400 |

The composition according to an embodiment of the present invention is very suitable for use in a node separation process for the fabrication of a semiconductor capacitor.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A composition for filling small gaps in a semiconductor device, comprising:
   a silicone polymer, an end-capping agent, and a solvent, wherein the end-capping agent is represented by Formula 1:

$$[HO]_x\text{—R—}[CO_2H]_y \quad (1)$$

wherein R is an allyl group or a $C_1$-$C_{12}$ straight, branched, or cyclic alkyl group, x is an integer from 2 to 4, and y is an integer from 0 to 1; and
   further wherein the silicone polymer is a polysilsesquioxane.

2. The composition as claimed in claim 1, wherein the composition comprises 0.001 to 10 parts by weight of the end-capping agent of Formula 1, 1 to 50 parts by weight of the silicone polymer and 40 to 98 parts by weight of the solvent.

3. The composition as claimed in claim 1, wherein the solvent is selected from the group consisting of alcohols, esters, glymes, ethers, cyclic ketones, and mixtures thereof.

4. The composition as claimed in claim 1, further comprising a surfactant.

5. The composition as claimed in claim 1, wherein the polysilsesquioxane is a compound represented by Formula 2:

$$\{(R'SiO_{1.5})_x(HSiO_{1.5})_y(X(CH_2)_nSiO_{1.5})_z\}_m \quad (2)$$

wherein x, y and z satisfy the relations x+y+z=1, 0.05≤x≤0.9, 0≤y≤0.9 and 0.05≤z≤0.9, X is a $C_6$-$C_{12}$ aryl group, R' is a $C_1$-$C_6$ alkyl group, n is from 0 to 2, and m is from 12 to 2,000.

6. The composition as claimed in claim 1, wherein the polysilsesquioxane is a compound represented by Formula 3:

$$\{(R'SiO_{1.5})_s(HSiO_{1.5})_t(X(CH_2)_lSiO_{1.5})_u(SiO_{1.5}(CH_2)_mSiO_{1.5})_v\}_n \quad (3)$$

wherein s, t, u and v satisfy the relations s+t+u+v=1, 0.05≤s≤0.9, 0≤t≤0.9, 0.05≤u≤0.9 and 0.05≤v≤0.9, X is a $C_6$-$C_{12}$ aryl group, R' is a $C_1$-$C_6$ alkyl group, l and m are independently from 0 to 2, and n is from 12 to 2,000.

7. The composition as claimed in claim 1, wherein the silicone polymer has a weight average molecular weight of 1,000 to 30,000.

8. A method for fabricating a semiconductor capacitor, the method comprising the steps of:
   forming an oxide mold (an oxide for patterning) on a semiconductor substrate to form patterned holes;
   depositing an electrode material on the oxide mold (the oxide for patterning);
   filling the composition according to claim 1 in the patterned holes deposited with the electrode material;
   developing the resulting structure with a developing solution to remove the composition coated on the top portions of the electrode material layer, followed by baking;
   removing the top portions of the electrode material layer by etch back; and
   simultaneously removing the oxide mold (the oxide for patterning) and the remaining composition filled in the patterned holes by wet etching to form lower electrodes.

9. The method as claimed in claim 8, wherein the wet etching is performed using a hydrofluoric acid solution.

10. The method as claimed in claim 8, wherein the electrode material is Ti/TiN.

11. The composition as claimed in claim 1, wherein, in Formula 1, R is an allyl group or a $C_2$-$C_{12}$ branched or cyclic alkyl group, x is an integer from 2 to 4, y is an integer from 0 to 1, and R includes a carbon chain of two or three carbons that joins two of the hydroxyls.

12. The composition as claimed in claim 1, wherein the end-capping agent is ethylene glycol.

13. The composition as claimed in claim 1, wherein the end-capping agent is 2,2-bis(hydroxymethyl)propionic acid.

* * * * *